Feb. 28, 1933.    D. E. STINES ET AL    1,899,886

GAUGE GLASS

Filed June 20, 1932

INVENTORS.
Daniel E. Stines
John W. Packie
BY
W. E. Currie  ATTORNEY

Patented Feb. 28, 1933

1,899,886

UNITED STATES PATENT OFFICE

DANIEL E. STINES, OF PLAINFIELD, AND JOHN W. PACKIE, OF GREEN VILLAGE, NEW JERSEY, ASSIGNORS TO STANDARD OIL DEVELOPMENT COMPANY, A CORPORATION OF DELAWARE

GAUGE GLASS

Application filed June 20, 1932. Serial No. 618,264.

This invention relates to the art of determining the levels of different immiscible or partly immiscible fluids contained in a vessel such as a tank.

It is customary, where steam is used to aid distillation of oil, to condense the vapors and pass the condensate to a settling tank where the oil and water are separately removed and it is necessary in this case to know at all times the levels of the oil and water.

When fluids having a vapor pressure higher than 760 mm. of mercury are separated from water in a closed vessel at a pressure greater than that of atmospheric, certain safeguards are essential. In withdrawing the water from such a closed vessel to the sewer, it is hazardous to allow any of the high vapor pressure fluid to escape with the water. It is also necessary in the proper operation of a process that the water level does not rise or fall too far. Therefore, in order to efficiently operate the process, it is essential that the liquid levels should be readily determined. With the gauge glasses commonly used at present for showing liquid levels in the above cases and many other cases, it is often difficult to determine the interfaces of several fluids present, especially if two of the fluids are of substantially the same color.

An object of this invention is to provide means for satisfactorily determining the levels of immiscible fluids in containers and to facilitate the regulation of the separate removal of one or more of the immiscible fluids.

Another object of the invention is to provide means for determining which of several possible fluids is or are present in a container.

Another object of this invention is to provide means for determining the levels of immiscible fluids in a container even though the inside of a gauge glass used for this purpose is coated with a dark substance that makes direct reading of the levels impossible.

We have discovered a means of utilizing the well known principle of the difference in refractive indices of different fluids or media to make a direct reading of the levels of the different immiscible fluids in a container, which reading is clearly indicated on the face of the gauge glass.

Figure 3:
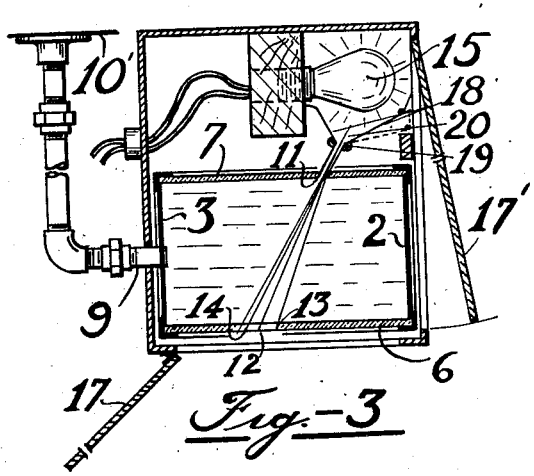
Figure 4:
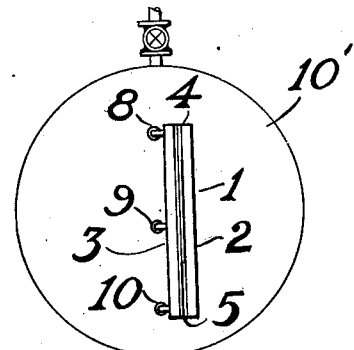
Figure 2:
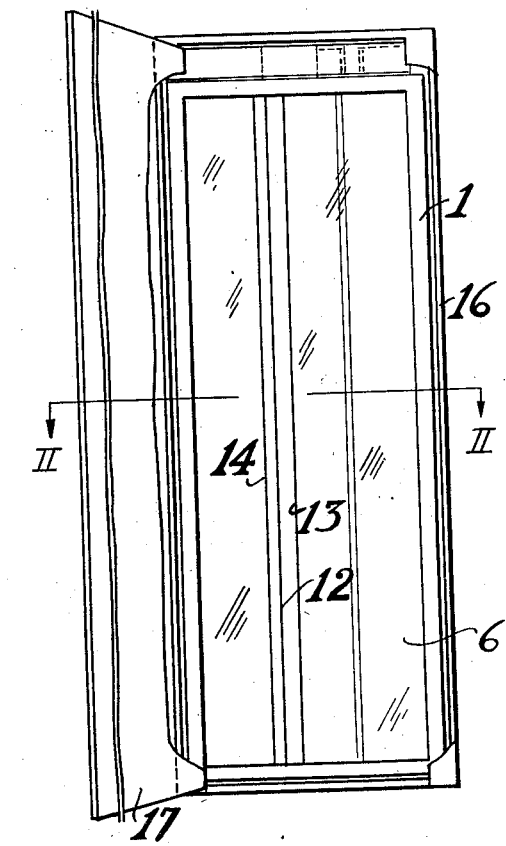
Figure 1:
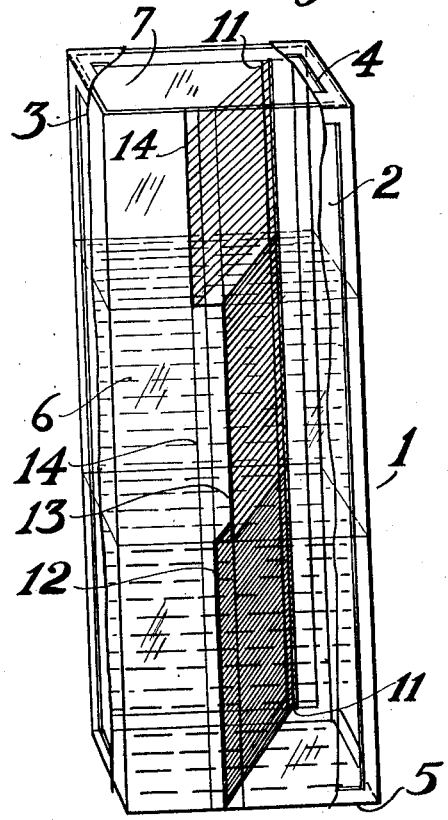

In order to clearly describe our invention, we have reference to the accompanying drawing in which—Fig. 1 is a vertical and more or less diagrammatic perspective view illustrating the principle of the invention; Fig. 2 is a front vertical view of the gauge glass enclosed with a casing; Fig. 3 is a horizontal section taken on the line II—II of Fig. 2; and Fig. 4 is a vertical assembly view of the application of the gauge glass.

Referring to the drawing, the gauge 1 shown is a rectangular casing having side walls 2 and 3 and top and bottom covers 4 and 5, and a pair of transparent or translucent walls or plates on the front and back. The transparent or translucent front and back plates 6 and 7 may be made of glass or other suitable transparent or translucent material. The side walls 2 and 3 and the top and bottom plates 4 and 5 may be of iron or brass or any other suitable opaque material. The assembly is an air-tight structure with communicating pipes 8, 9 and 10 opening into a container 10' where the fluids whose levels are to be indicated are retained. Back plate 7 is coated on both sides with a suitable opaque material such as paint, except for a narrow vertical slot 11 running the length of the plate through which light rays pass through the glass at an angle to the plane of the plate. The back plate may consist of a glass plate with a metal plate superimposed, the metal having a narrow vertical slot which permits light to strike the glass at an angle to the plate of the glass. On the front glass plate 6, narrow vertical lines 12, 13 and 14 may be painted from the top to the bottom of the glass at predetermined points to which beams of light passing through the narrow vertical opening 11 are refracted by different fluids or media through which they pass. In this case, for illustration, the narrow vertical lines show the points to which the beams of light passing through the slotted opening 11 and the different fluids such as water, oil and air are refracted, as indicated by the numerals 12, 13 and 14. A suitable bank 15 of electric light globes is placed in a vertical position at an angle to the slotted opening 11 from the top to the bottom of the casing 1. Adjustable shields 18 are provided between the electric light globes 15 and the back plate 7. The shields 18 may be moved by rods 19 attached to the ends of the shields 18 to regulate the size of the opening 20 through which the light passes from the electric light globes 15 to the slot 11. If the inside faces of the plates 6 and 7 are coated with a tarry oil or distillate, the electric light globes may be of high candle power such as 100 to 150, so that the light may penetrate through. The presence of a tarry coating on the inside faces of these plates does not materially interfere with the indication of the liquid levels unless this covering is so heavy that no light may penetrate through.

Fig. 2 illustrates the casing 1 enclosed in an outside casing 16 to protect the instrument and also as a safeguard in case of a rupture of any of the plates while using this instrument to indicate levels of oil and acid or hot oil. The bank of electric light globes 15 may be inside of the outside casing 16 behind casing 1. Suitably hinged doors 17 and 17' are shown; the front door may be fitted with a glass side to take the readings; the side door is used as a means of access to replace burnt out electric light globes, and both closed if any leaks are found in the gauge glass. This outside casing 16 may be of any construction such as iron lined with lead, or brass. The levels of oil and water are readily determined by this gauge. The narrow beams or rays of light passing through the vertical slot in the back of the gauge will be refracted at different angles by the oil and water and will appear as a broken line on the front glass.

The advantages secured by this gauge glass are that levels of immiscible or partly immiscible liquids that may be of the same color, such as water and gasoline, are readily indicated by the vertical line of light that is transmitted from the face of the glass. If one of the fluids that is in the gauge glass refracts the beams of light outside the front plate, the level of this fluid can readily be seen by the position to which the other fluids in the gauge glass refract the light. Where the inside of the glass is coated with a tarry oil or distillate that is translucent though not transparent enough to see the levels of the liquids inside of the gauge, this instrument readily indicates the levels of the different fluids inside of the container.

This instrument may be used to determine the levels of any translucent immiscible fluids contained in a container where the fluids have different refractive indices. The refractive index of any fluid is readily determined and by painting a narrow vertical line on the face of the instrument at a particular location, this glass will permit the determination of the presence of that fluid in the container by noting if the rays of light fall on the painted narrow vertical line.

The foregoing description is merely illustrative and alternative arrangement may be made within the scope of the appended claims in which it is our intention to claim all novelty as broadly as the prior art permits.

We claim:

1. The method of indicating the levels of immiscible fluids with different refractive indices which comprises passing narrow beams of light horizontally through vertical columns of fluids and observing the change of the points of emergence of the narrow beams of light disclosing different fluids having a different angle of refraction.

2. The method of indicating the relative levels of immiscible fluids with different refractive indices which comprises directing parallel rays of light horizontally and at an angle toward said fluids from a long narrow vertical source of light extending the height of the fluids and determining the various levels of the fluids by the position at which the light emerges from the fluids.

3. The method of indicating the levels of immiscible fluids with different refractive indices which comprises a separate column of immiscible fluids communicating with a large body of the same fluids, a narrow vertical source of light extending along the whole column of immiscible fluids and in the back of the column of immiscible fluids, lines on face of the column of immiscible fluids placed at various points to indicate the points to which horizontal rays of light passing from the source of light through various immiscible fluids will convey various groups of rays to the eyes of an observer and means passing light rays horizontally from the source of light through the column of immiscible fluids to the eyes of the observer.

4. The method of indicating the levels of immiscible fluids in a large body of fluids by observing the different rays of light that are passed from a column of fluids communicating with a large body of fluids which comprises indicating by lines on the face of the column of immiscible liquids various points to which various fluids refract light passing from a set source of light through the immiscible fluids and means of passing horizontal rays of light from the set source of light through the vertical length of the column of immiscible fluids and observing the points of emergence of the rays along the various lines on the face of the fluid.

5. In combination, a column of immiscible fluids with different refractive indices, a source of light, means for directing narrow parallel rays of light horizontally and at an angle from said source of light toward said column, and means of observing the points of emergence of the rays of light from the fluids.

6. In a gauge glass to indicate levels of immiscible fluids in a container, a rectangular casing adapted to hold a body of immiscible fluids and communicating with a container, the rectangular casing fitted with opaque sides and opaque top and bottom covers, a back plate in which is a narrow vertical transparent slot running the vertical length of the casing and a front transparent plate on which are narrow vertical lines indicating the various points of emergence of rays of light passing horizontally from the narrow vertical slot in the back plate through various fluids to the front plate.

DANIEL E. STINES.
JOHN W. PACKIE.